(12) United States Patent
Matsushita (10) Patent No.: US 7,581,461 B2
(45) Date of Patent: Sep. 1, 2009

(54) TRANSMISSION FOR VEHICLES

(75) Inventor: Masahiro Matsushita, Okazaki (JP)

(73) Assignees: Mitsubishi Jidosha Kogyo Kabushiki Kaisha, Tokyo (JP); Mitsubishi Jidosha Engineering Kabushiki Kaisha, Okazaki-shi (JP)

( * ) Notice: Subject to any disclaimer, the term of this patent is extended or adjusted under 35 U.S.C. 154(b) by 0 days.

(21) Appl. No.: 12/073,024

(22) Filed: Feb. 28, 2008

(65) Prior Publication Data

US 2008/0242467 A1 Oct. 2, 2008

(30) Foreign Application Priority Data

Mar. 30, 2007 (JP) ............... 2007-094597

(51) Int. Cl.
*F16H 3/08* (2006.01)
(52) U.S. Cl. ............... 74/333; 74/329; 74/331; 74/340; 74/352; 74/411.5
(58) Field of Classification Search ............... 74/325, 74/329, 330, 331, 333, 339, 340, 352, 411.5; 192/219.5, 13 R, 14; 188/31, 69
See application file for complete search history.

(56) References Cited

U.S. PATENT DOCUMENTS

| 5,417,125 | A | 5/1995 | Janiszewski | |
|---|---|---|---|---|
| 5,696,680 | A * | 12/1997 | Ichioka et al. | 701/67 |
| 6,616,571 | B2 * | 9/2003 | Kigoshi | 477/36 |
| 6,868,952 | B2 * | 3/2005 | Burger | 192/219.4 |
| 2006/0032320 | A1 | 2/2006 | Seo | |
| 2006/0266144 | A1 * | 11/2006 | Schafer et al. | 74/340 |
| 2007/0277634 | A1 * | 12/2007 | Komori | 74/331 |
| 2008/0011576 | A1 * | 1/2008 | Lin et al. | 192/219.4 |
| 2008/0047378 | A1 * | 2/2008 | Borgerson et al. | 74/331 |

FOREIGN PATENT DOCUMENTS

| EP | 1566569 A1 | 8/2005 |
|---|---|---|
| EP | 1643169 A2 | 4/2006 |
| JP | 59134017 A * | 8/1984 |
| JP | 2002-89594 A | 3/2002 |
| JP | 2006-52832 A | 2/2006 |

* cited by examiner

*Primary Examiner*—David D. Le
(74) *Attorney, Agent, or Firm*—Birch, Stewart, Kolasch & Birch, LLP (57) ABSTRACT

A transmission for vehicles is composed of an input shaft provided with a plurality of drive gears and connected to a drive shaft of an engine, an output shaft disposed parallel to the input shaft, driven gears which mesh with the drive gears, individually, and are rotatably disposed on the output shaft, a synchromesh mechanism which includes a sleeve axially movable relative to the output shaft and engages with a side of the driven gears, thereby connecting the driven gears to the output shaft, and a parking gear formed integrally on a hub of the synchromesh mechanism, the parking gear radially overlapping a bearing from outside. Thus, there may be provided a transmission for vehicles that requires less component parts and has a small transverse dimension.

12 Claims, 4 Drawing Sheets

TRANSMISSION FOR VEHICLES

CROSS-REFERENCE TO RELATED APPLICATIONS

This application is based upon and claims the benefit of priority from prior Japanese Patent Application No. 2007-094597, filed Mar. 30, 2007, the entire contents of which are incorporated herein by reference.

BACKGROUND OF THE INVENTION

1. Field of the Invention

The present invention relates to a transmission for vehicles, and more particularly, to a transmission for vehicles with an improved mounting structure for a parking gear used to fix a vehicle to be parked.

2. Description of the Related Art

Among transmissions for vehicles (automobiles), there is one called a double-clutch (or twin-clutch) transmission. The double-clutch transmission is composed of two clutch devices and a gear mechanism in which drive gears and driven gears continuously mesh with one another. Thus, the double-clutch transmission has an effect that it can perform a continuous speed change operation with a short time lag and power transmission with little loss.

In general, moreover, an automatic transmission is provided with a parking gear. When the transmission is set to the parking position, the parking gear is engaged and fixed by a pawl portion. Thereupon, output shafts of the transmission are fixed so that the parked vehicle is prevented from moving unexpectedly.

If the vehicle is parked in an inclined place, on the other hand, its weight acts on the parking gear and the pawl portion via drive gears. In consequence, an excessive load is applied to the parking gear.

A double-clutch transmission that copes with this situation is described in Jpn. Pat. Appln. KOKAI Publication No. 2006-52832. This transmission is provided with four driven gears for first, second, third, and fourth gear positions on a first output shaft and three driven gears for fifth, sixth, and reverse gear positions on a second output shaft. A parking gear is provided between the third and fourth driven gears.

In the transmission described above, however, the parking gear is situated between the other gears, so that the output shafts are inevitably long. Therefore, the transmission also has a large axial dimension, so that an engine that is provided with the transmission is inevitably large as a whole. Further, the transmission of this type requires more component parts and entails machining operations for the parking gear to be mounted on the output shaft and much trouble of assembling the parts.

There is also a front-engine, front-wheel-drive (FF) vehicle that incorporates an engine, transmission, drive mechanism, steering mechanism, etc., in its front part. In transversely mounting the engine in the FF vehicle arranged in this manner, the axial dimension of the transmission, in particular, is expected to be reduced so that the engine can be easily assembled without interfering with the steering mechanism, side members, etc.

BRIEF SUMMARY OF THE INVENTION

The object of the present invention is to solve the problems described above and provide a transmission for vehicles, requiring use of fewer component parts and simplified operations for mounting a parking gear and having a reduced axial dimension.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

One embodiment of a transmission for vehicles according to the present invention will be described with reference to the accompanying drawings.

Figure 1:
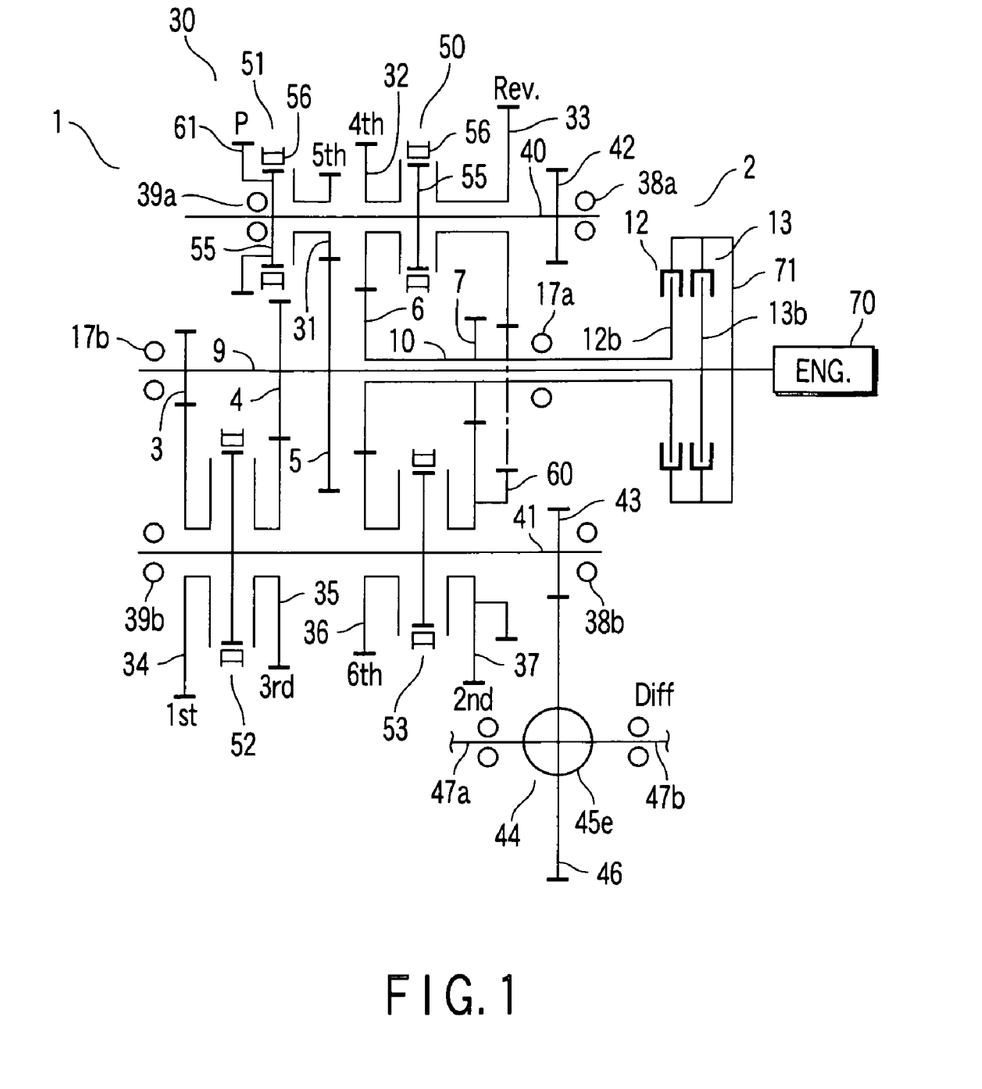
FIG. 1 is a configuration diagram showing one embodiment of a double-clutch transmission according to the invention.

FIG. 1 shows a schematic configuration of the transmission for vehicles. The transmission is a double-clutch transmission, which is provided with two sets of clutches. The transmission has seven gear positions in total, including six forward positions and one reverse position, and is transversely mounted in a vehicle. In FIG. 1, reference number 1 denotes a body portion of the transmission for vehicles. The body portion 1 is composed of an input system 2 and an output system 30.

Figure 2:
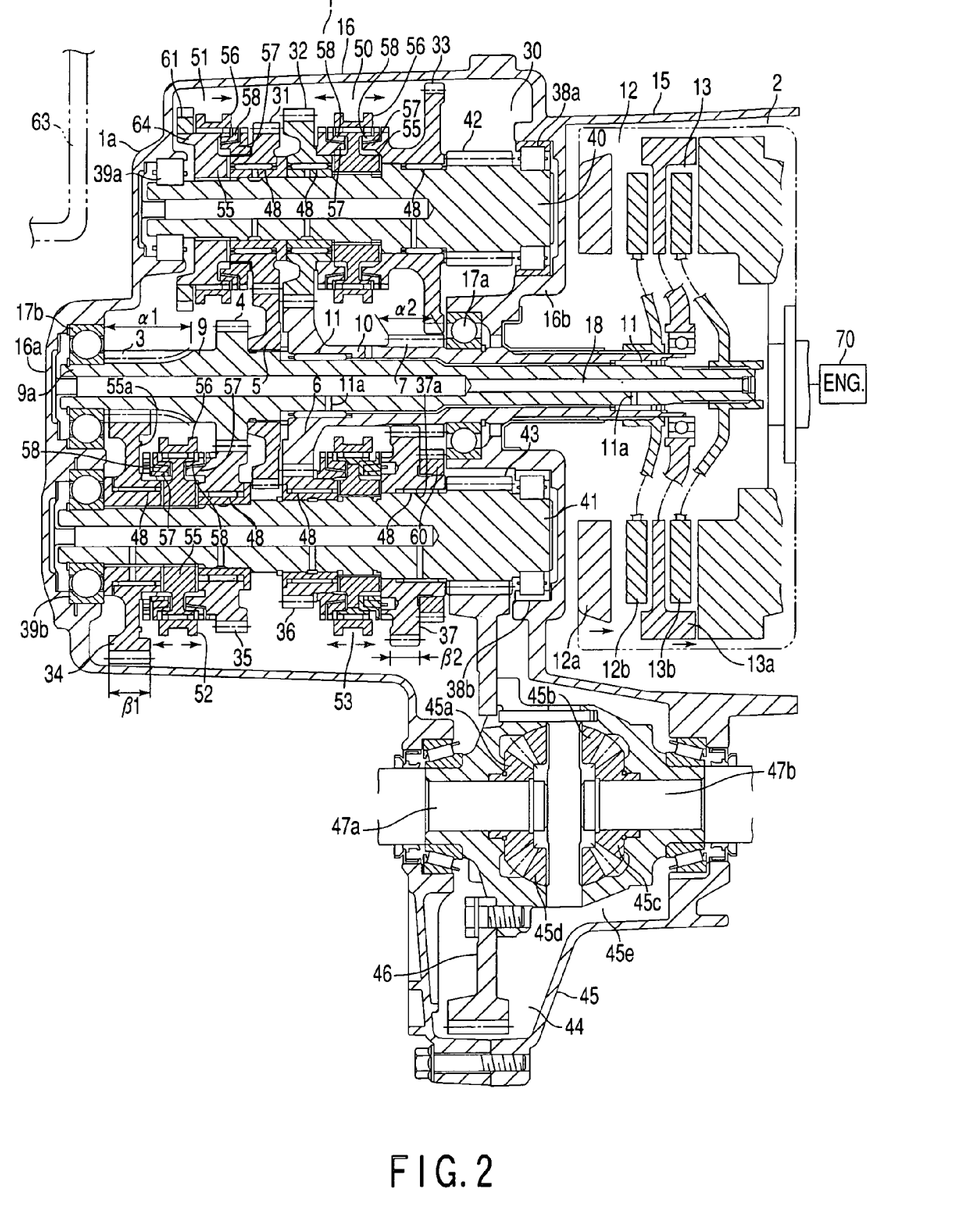
FIG. 2 is a sectional view showing the one embodiment of the double-clutch transmission.
Figure 3:
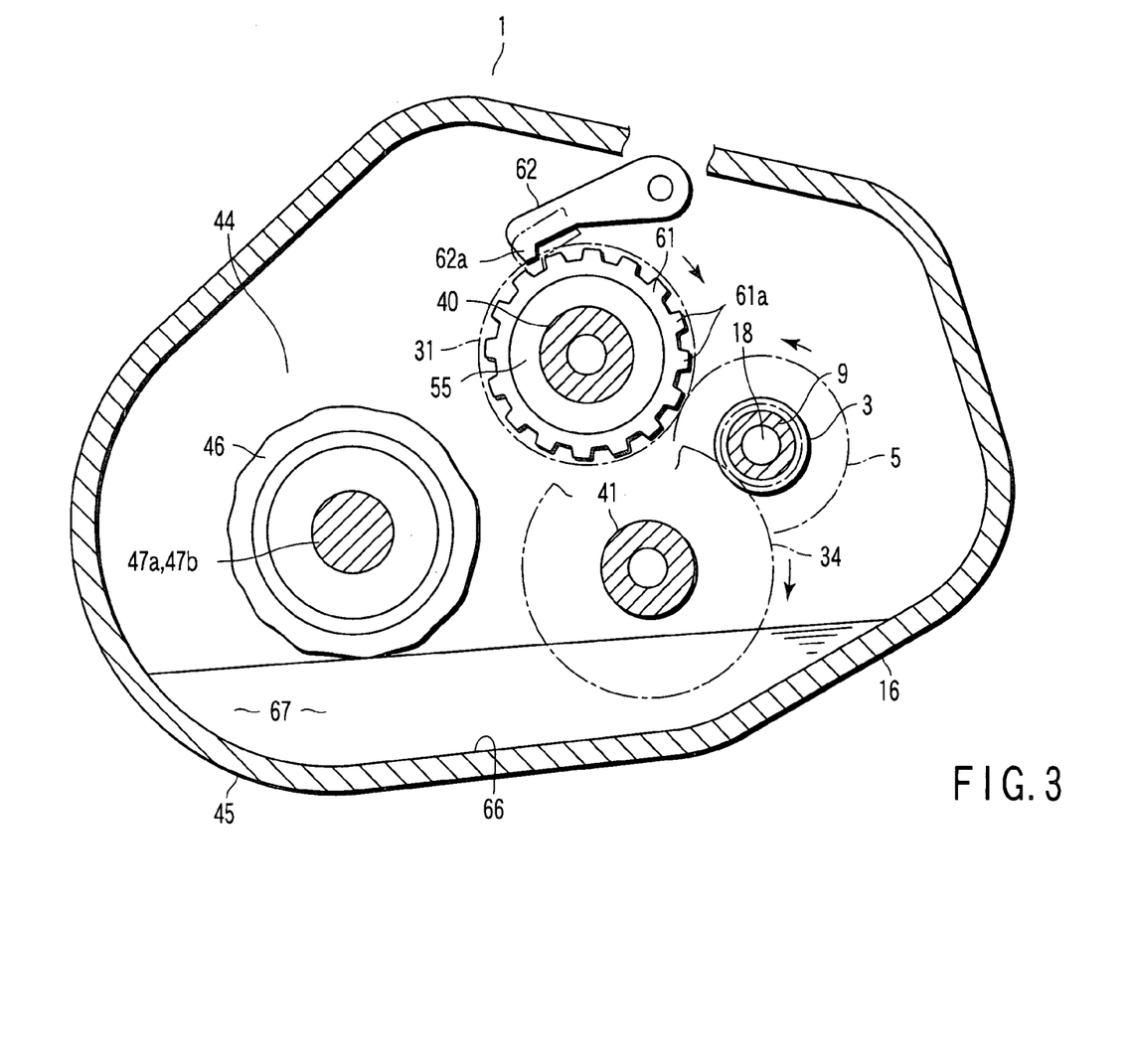
FIG. 3 is a side sectional view of the transmission shown in FIG. 2.

The input system 2 will now be described with reference to FIGS. 2 and 3. FIG. 2 is a front sectional view showing a development of the transmission for vehicles, and FIG. 3 is a side sectional view showing a side surface of the transmission in section.

The input system 2 is composed of a first input shaft 9, a second input shaft 10, a first clutch 13, a second clutch 12, etc.

In FIG. 2, reference number 15 denotes a clutch case that contains the clutches 12 and 13. Reference number 16 denotes a transmission case that is connected to the clutch case 15.

The input shaft 9 is disposed substantially in the center of the transmission case 16. The input shaft 9 is in the form of a column, one end of which is situated at an end portion of the clutch case 15 on the side of an engine 70. The other end of the input shaft 9 extends deep into the transmission case 16, that is, on the side opposite from the clutch 12 and the like, and is situated near an end wall 16a. A bearing 17b is disposed on the end wall 16a. The other end of the input shaft 9 is rotatably assembled on the bearing 17b. A through hole 18 is provided at the axial portion of the input shaft 10 so as to extend axially. A lubricant 67 shown in FIG. 3 is fed into the through hole 18 and circulated axially.

The input shaft 10 is a cylindrical structure that is assembled on the outer periphery of the input shaft 9. The input shaft 10 is about half as long as the input shaft 9 and coaxially overlaps the input shaft 9 as it extends substantially up to the center of the transmission case 16 from its end on the clutch 12 side. Needle bearings 11 are disposed individually on the opposite ends of the input shaft 10.

The needle bearings 11 support the input shaft 10 for rotation around its axis with respect to the input shaft 9. Further, the input shaft 9 is provided with a through hole 11a. The through hole 11a communicates with the through hole 18 so that the lubricant 67 circulated through the hole 18 can be fed into the needle bearings 11 through the hole 11a.

Furthermore, a bearing 17a is provided in an axially intermediate position around the input shaft 10. The bearing 17a is mounted on an end wall 16b that serves as a partition between the clutch case 15 and the transmission case 16. Thus, the input shaft 10 is rotatably supported by the transmission case 16 with the aid of the bearing 17a.

In this manner, the input shafts 9 and 10 are individually rotatably mounted on the transmission case 16 by means of bearings 17a and 17b and the needle bearings 11. Further, the input shafts 9 and 10 are assembled on each other for rotation around their axis by means of the bearings 17a and 17b and the needle bearings 11.

Furthermore, the input shafts 9 and 10 are individually provided with drive gears 3 to 7. More specifically, the drive gears 3, 4 and 5 that establish odd-numbered gear positions, first, third, and fifth, respectively, are disposed on a shaft portion 9a of the input shaft 9 that projects from the input shaft 10. The gears 3, 4 and 5 are arranged at increasing distances from the bearing 17b (on the rear end side of the transmission) in the order named. Besides, the input shaft 10 is provided with a drive gear 6 that establishes fourth and sixth gear positions and a drive gear 7 that establishes a second gear position.

The first drive gear 3 is formed directly on the outer peripheral surface of the input shaft 9 so that a high reduction ratio can be obtained. Each of the drive gears 4 and 5 is obtained by providing a disc-shaped hub portion on the input shaft 9 and forming mating teeth on the hub portion. Further, the third drive gear 4 is disposed beside the drive gear 3. Since the drive gear 4 is located adjacent to the drive gear 3, a tool for forming the gear 3 can be prevented from interfering with the gear 4, so that the gear 4 can be brought close to the gear 3.

The input shaft 10 is provided with the drive gear 6 that serves for both the fourth and sixth gear positions and the drive gear 7 for the second gear position.

The two sets of clutches (twin clutch) are disposed in the clutch case 15. The twin clutch includes the clutches 12 and 13.

The clutch 12 is composed of a pressure plate 12a and a dry clutch plate 12b. The clutch 13 is composed of a pressure plate 13a and a dry clutch plate 13b. The pressure plates 12a and 13a are connected to the output shaft of the engine 70 so that they can rotate together with the output shaft. The dry clutch plates 12b and 13b are connected to the input shafts 10 and 9, respectively.

If the clutch 12 is actuated by a drive mechanism (not shown), the pressure plate 12a and the clutch plate 12b closely contact each other. If the clutch 13 is actuated, moreover, the pressure plate 13a and the clutch plate 13b closely contact each other.

If the clutch 13 is engaged, therefore, the rotating force of the engine is transmitted to the odd-numbered drive gears 3 to 5 through the input shaft 9. If the clutch 12 is engaged, on the other hand, the rotating force of the engine is transmitted to the even-numbered drive gears 6 and 7 through the input shaft 10.

The output system 30 will now be described with reference to FIGS. 2 and 3.

The output system 30 includes a first output shaft 40 and a second output shaft 41. The output shafts 40 and 41 are individually provided with driven gears 31 to 37 and synchromesh mechanisms 50 to 53.

Both the output shafts 40 and 41 are arranged parallel to the input shafts 9 and 10 in the transmission case 16. The output shafts 40 and 41 are located above and below the input shaft 9, respectively.

The output shafts 40 and 41 have their respective end portions on the clutch 12 side situated near the end wall 16b. Bearings 38a and 38b are disposed on the end wall 16b. An end of the output shaft 40 on the clutch 12 side is rotatably assembled on the bearing 38a, and an end of the output shaft 41 on the clutch 12 side to the bearing 38b.

Further, bearings 39a and 39b are disposed on the end wall 16a on the rear end side of the transmission. An end of the output shaft 40 on the rear end side of the transmission is rotatably assembled on the bearing 39a, and an end of the output shaft 41 on the rear end side of the transmission to the bearing 39b.

Furthermore, an output gear 42 is provided on the end portion of the output shaft 40 on the clutch 12 side, and an output gear 43 on the end portion of the output shaft 41 on the clutch 12 side. The output gears 42 and 43 individually mesh with a ring gear 46 of a differential mechanism 44. FIG. 3 is a side sectional view of the transmission for vehicles.

An outer wall 45 is formed on a side portion of the transmission case 16. The differential mechanism 44 is disposed inside the outer wall 45.

The following is a description of the differential mechanism 44.

The differential mechanism 44 is composed of a differential gear portion 45e, the ring gear 46 (reduction gear), axels 47a and 47b, etc.

The differential gear portion 45e is a combination of pinion gears 45a, 45b, 45c and 45d. The ring gear 46 meshes with the output gears 42 and 43, as mentioned before, and transmits a rotation to the differential gear portion 45e. The axels 47a and 47b transmit rotating forces distributed by the differential gear portion 45e to left and right drive wheels (not shown), individually.

The respective reduction ratios of the output gears 42 and 43 are set so that the final reduction ratio of the output shaft 40 is higher than that of the output shaft 41.

Further, the output shaft 40 is provided with three driven gears 31, 32 and 33, which are arranged at increasing distances from the bearing 39a in the order named. Furthermore, the output shaft 41 is provided with four driven gears 34, 35, 36 and 37, which are arranged at increasing distances from the bearing 39b in the order named. Each of the driven gears 31 to 37 is rotatably mounted on the outer peripheral surface of the output shaft 40 or 41 by means of a needle bearing 48.

The driven gear 31 is a fifth driven gear that meshes with the drive gear 5. The driven gear 32 is a fourth driven gear that meshes with the drive gear 6. The driven gear 33 is a reverse driven gear.

Further, the driven gear 34 is a first driven gear that meshes with the drive gear 3. The driven gear 35 is a third driven gear that meshes with the drive gear 4. The driven gear 36 is a sixth driven gear that meshes with the drive gear 6. The driven gear 37 is a second driven gear that meshes with the drive gear 7.

The drive gear 3 has a face width α1, which is larger than a face width β1 of the driven gear 34 that meshes with the drive gear 3. Further, the drive gear 7 has a face width α2, which is larger than a face width β2 of the driven gear 37 that meshes with the drive gear 7. The driven gears 34 and 37 mesh with the drive gears 3 and 7, respectively, in a manner such that they are shifted to one side widthways relative to the face.

Thus, the gear positions are set individually for the output shafts 40 and 41 so that the number of gear positions for the output shaft 40 is smaller than that for the output shaft 41.

Further, the synchromesh mechanisms 50 to 53 are individually provided near the driven gears 31 to 37. The following is a description of the synchromesh mechanisms.

The synchromesh mechanism 50 is located between the fourth driven gear 32 and the reverse driven gear 33 on the output shaft 40. The synchromesh mechanism 50 is configured to be actuated in two directions. When it is actuated (or shifted) in either direction, the fourth or reverse gear position is selected.

The synchromesh mechanism 51 is located between the fifth driven gear 31 and the bearing 39a on the output shaft 40. The synchromesh mechanism 51 is configured to be actuated in only one direction. When it is actuated, the fifth gear position is selected.

The synchromesh mechanism 52 is located between the first driven gear 34 and the third driven gear 35 on the output shaft 41. The synchromesh mechanism 52 is configured to be actuated in two directions. When it is actuated in either direction, the first or third gear position is selected.

The synchromesh mechanism 53 is located between the sixth driven gear 36 and the second driven gear 37 on the output shaft 41. The synchromesh mechanism 53 is configured to be actuated in two directions. When it is actuated in either direction, the sixth or second gear position is selected.

The following is a detailed description of the construction of the synchromesh mechanism 50. Since the synchromesh mechanisms 52 and 53 are constructed in the same manner as the synchromesh mechanism 50, a detailed description of their respective constructions is omitted.

The synchromesh mechanism 50 is composed of a synchronizer hub 55, a synchronizer sleeve 56, a synchronizer cone 57, a synchronizer ring 58, etc.

The synchronizer hub 55 is fixed to the output shaft 40 by spline fitting or the like. The synchronizer sleeve 56 is assembled on the outer peripheral portion of the synchronizer hub 55 for axial siding motion. Further, the synchronizer cone 57 is formed on each of the fourth driven gear 32 and the reverse driven gear 33 that are located individually on the opposite sides of the synchronizer hub 55. The synchronizer ring 58 is fitted on an outer peripheral conical surface of the synchronizer cone 57. These reference numbers are used for the illustration of the synchromesh mechanisms 50 and 52.

If the synchromesh mechanism 50 is shifted toward the driven gear 32, for example, the synchronizer sleeve 56 slides toward the driven gear 32. Thereupon, the difference between the respective rotational speeds of the driven gear 32 and the output shaft 40 is reduced by friction between the synchronizer ring 58 and the synchronizer cone 57. When the synchronizer sleeve 56 is engaged, the output shaft 40 and the driven gear 32 engage (or simultaneously mate) and are rotated together with each other.

Further, the synchromesh mechanism 50 is also shifted toward the driven gear 33 in like manner, so that it is engaged. Furthermore, the synchromesh mechanisms 52 and 53 are actuated in the same manner as the synchromesh mechanism 50, whereby the driven gears and the output shafts are caused to engage with one another.

A recess 55a is formed in a side surface of the driven gear 34 on the synchromesh mechanism 52 side. The recess 55a is an annular recess that is formed around the axis of the output shaft 41. The synchronizer ring 58 and the synchronizer cone 57 of the synchromesh mechanism 52 are disposed in the recess 55a.

When the synchronizer sleeve 56 slides toward the driven gear 34, therefore, the synchromesh mechanism 52 simultaneously engages in a position where a part of the sleeve 56 is located in the recess 55a. Thus, the synchromesh mechanism 52 is disposed close to the driven gear 34.

An idler gear 60 is attached to a side portion of the second driven gear 37 opposite from the synchromesh mechanism 53. The idler gear 60 is a reverse gear, which is mounted coaxially with the driven gear 37. The idler gear 60 is smaller in diameter than the driven gear 37 and meshes with the reverse driven gear 33 on the output shaft 40.

When the synchromesh mechanism 50 is actuated to cause the reverse driven gear 33 to engage with the output shaft 40, the output of a reverse rotation that is reduced based on the respective reduction ratios of the second and reverse gear positions and the final reduction ratio of the output shaft 40 is transmitted from the input shaft 10 to the differential mechanism 44.

The driven gear 33 applies a load to a bearing surface 37a of the driven gear 37. However, the width of the bearing surface 37a is widened by the installation of the idler gear 60. Since the needle bearing 48 is biased toward the idler gear 60, moreover, the bearing surface 37a is rotatably supported with a good balance.

Figure 4:
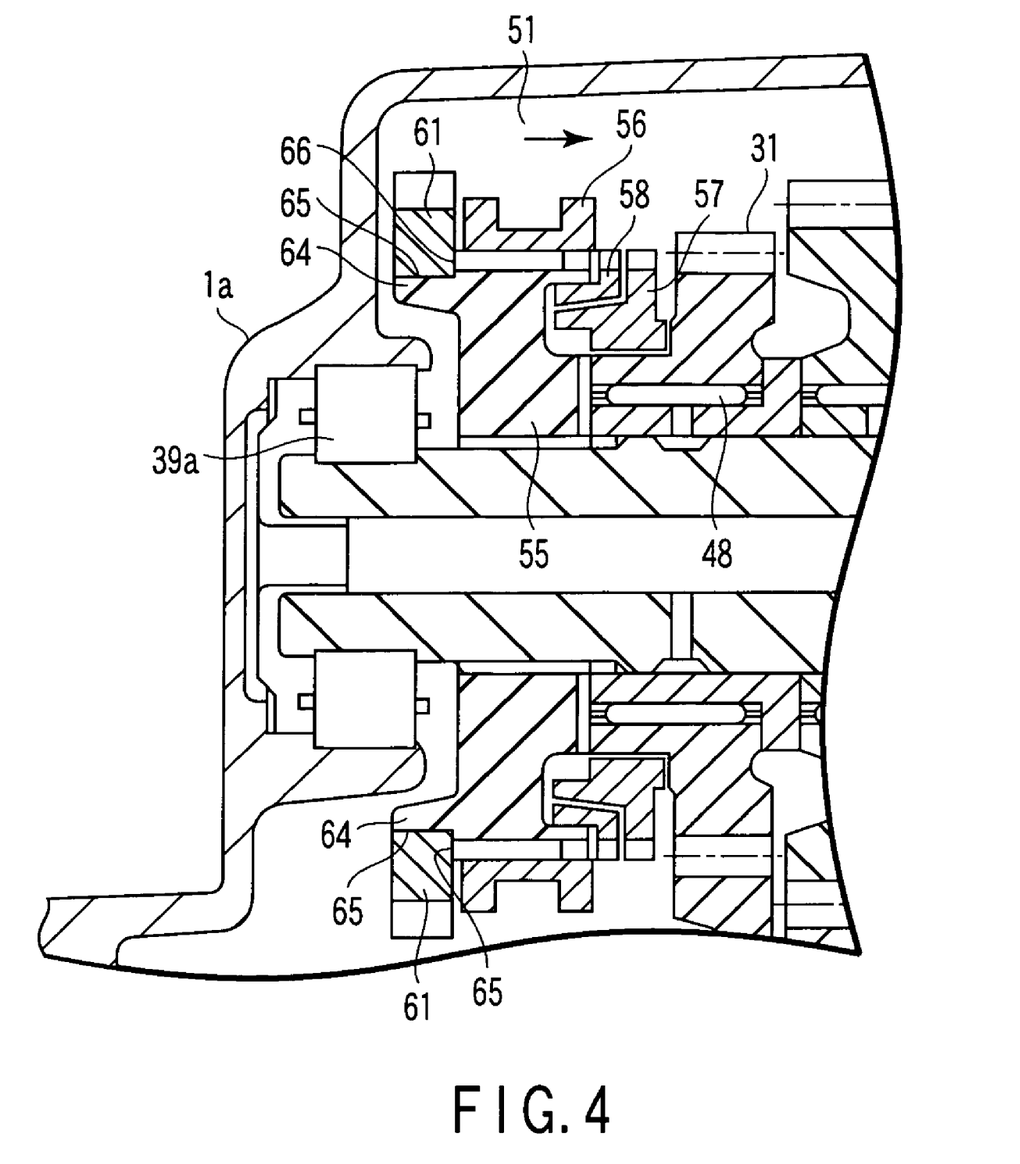
FIG. 4 is a partially enlarged sectional view showing a parking gear of the transmission of FIG. 2 and its surroundings.

As shown in FIGS. 2 and 4, furthermore, a parking gear 61 is disposed on an end portion (retracted end portion) of the output shaft 40 on the rear end side of the transmission. The parking gear 61 is formed integrally with the synchronizer hub 55 of the synchromesh mechanism 51.

The following is a description of the synchromesh mechanism 51.

The synchromesh mechanism 51 is constructed in the same manner as the synchromesh mechanism 50 provided that the synchronizer cone 57 and the synchronizer ring 58 on one side are omitted. The synchronizer hub 55 of the synchromesh mechanism 51 is fixed integrally on the end portion of the output shaft 40 opposite from the engine 70.

The synchronizer sleeve 56 of the synchromesh mechanism 51 can be shifted only toward the driven gear 31. When the sleeve 56 slides toward the driven gear 31, the difference in rotational speed is reduced by friction, as mentioned before, whereupon the output shaft 40 and the fifth driven gear 31 are caused to engage with each other.

As shown in FIG. 4, moreover, an extending end portion 64 is disposed on the outer peripheral end of the synchronizer hub 55. The extending end portion 64 is in the form of a hollow cylinder, the inside diameter of which is larger than the outside diameter of the bearing 39a. A part of an end portion of the extending end portion 64 on the bearing 39a side overlaps the outer periphery of the bearing 39a.

A fitting surface 65 is formed on the outer periphery of the extending end portion 64. The parking gear 61 is fitted integrally on the fitting surface 65. The diameter of the fitting surface 65 is one size smaller than that of a sliding surface on which the synchronizer sleeve 56 is slidably mounted. Thus, a stepped portion 66 is formed between the fitting surface 65 and the sliding surface. The parking gear 61 is pressed against the stepped portion 66 and positioned when it is fixed to the fitting surface 65.

As mentioned before, moreover, the synchronizer sleeve 56 is mounted for axial movement on the synchronizer hub 55. When the sleeve 56 moves toward the bearing 39a, it abuts an end surface of the parking gear 61 on the engine 70 side. Thus, the engine-side end surface of the gear 61 serves as a stop surface that stops the sleeve 56 from returning.

As shown in FIG. 3, furthermore, a pawl member 62 is provided near the parking gear 61. The pawl member 62 is rotatably assembled on the transmission case 16. If the gears of the transmission are arranged for parking by operating a shift control lever (not shown), the pawl member 62 engages with the parking gear 61. Thereupon, the output shaft 40 is locked by the parking gear 61 and the synchronizer hub 55. When the shaft 40 is locked, the axels 47a and 47b are locked, whereupon the vehicle is fixed.

With use of the parking gear 61 constructed in this manner, a side portion of the top of the body portion 1 can be recessed inward so that a projection on the rear end side of the transmission is smaller than projections at any other portions. Thus, when the engine that is furnished with the double-clutch transmission is transversely mounted in the vehicle, it can be prevented from interfering with frame members, such as a side frame 63, in the engine compartment.

Operations for engaging and disengaging the clutches 12 and 13, operations for shift-selection of the synchromesh mechanisms 50 to 53, etc., are performed by means of, for example, actuators (not shown) in response to commands from an electronic control unit (ECU) (not shown). The double-clutch transmission is subjected to automatic speed change in accordance with speed change information that is previously set in the ECU.

The following is a description of the operation of the double-clutch transmission.

First, a speed change command is output from the ECU to activate an actuator. Thereupon, the synchronizer sleeve 56 of the synchromesh mechanism 52 slides toward the first gear position so that the first driven gear 34 and the output shaft 41 engage with each other. Thus, the first gear position is selected. Thereafter, another actuator is activated in response to a similar speed change command, whereupon the clutch 13 is engaged. When the clutch 13 is engaged, a rotation output from the engine 70 is changed in speed along a transmission line of an odd-numbered system in which the output is transmitted from the input shaft 9 to the output shaft 41 via the first drive gear 3 and the first driven gear 34. Then, the speed-changed rotation output is transmitted from the output gear 43 to the differential mechanism 44 and delivered to the left and right axels 47a and 47b, whereupon the vehicle is driven in the first gear position. Thus, a gear shift to the first gear position is completed. In this state, the clutch 12 is disengaged.

Let it be supposed that a speed change command for the second gear position is output while the vehicle is running in the first gear position with the clutches 13 and 12 engaged and disengaged, respectively, as described above. In this state, the actuator is activated to slide the synchronizer sleeve 56 of the synchromesh mechanism 53 toward the second gear position. Then, the second driven gear 37 is caused to engage with the output shaft 41 that is rotating at a current vehicle speed. Thereupon, the second drive gear 7 is rotated in synchronism with the vehicle speed, whereupon a preparation for a gear shift or speed change is completed.

Thereafter, the clutch 13 is disengaged as the clutch 12 is engaged. Thereupon, the shaft to which power is transmitted from the engine 70 is switched from the input shaft 9 to the input shaft 10. As this is done, the rotation output from the engine 70 is changed in speed along a transmission line of an even-numbered system in which the output is transmitted from the input shaft 10 to the output shaft 40 via the second drive gear 7 and the second driven gear 37. The speed-changed rotation output is delivered from the output gear 43 to the differential mechanism 44. Thereupon, a gear shift to the second gear position is completed. As the gear shift is performed in this manner, the vehicle drive is instantly switched from the first gear position to the second gear position.

Let it be supposed that a speed change command for the third gear position is output while the vehicle is running in the second gear position with the clutches 12 and 13 engaged and disengaged, respectively. In this state, the actuator is activated to slide the synchronizer sleeve 56 of the synchromesh mechanism 52 toward the third gear position. Then, the third driven gear 35 is caused to engage with the output shaft 40 that is rotating at a current vehicle speed. In consequence, the third drive gear 4 is rotated in synchronism with the vehicle speed, whereupon a preparation for a gear shift to the third gear position is completed.

Thereafter, the clutch 12 is disengaged as the clutch 13 is engaged. Thereupon, the shaft to which power is transmitted from the engine 70 is switched again from the input shaft 10 to the input shaft 9. As this is done, the rotation output from the engine 70 is changed in speed along a transmission line of an odd-numbered system in which the output is transmitted from the input shaft 9 to the output shaft 41 via the third drive gear 4 and the third driven gear 35. The speed-changed rotation output is delivered from the output gear 43 to the differential mechanism 44. Thereupon, a gear shift to the third gear position is completed. As the gear shift is performed in this manner, the vehicle drive is instantly switched from the second gear position to the third gear position.

Gear shifts to the fourth, fifth, and sixth gear positions can be continuously performed on the spot in the same manner as in the shifts to the first, second, and third gear positions. Thus, a power transmission loss can be minimized during the gear shifts.

If the synchronizer sleeve 56 of the synchromesh mechanism 51 is moved toward the engine 70 in the fifth gear position, in particular, the output shaft 40 is connected to the input shaft 9, whereupon the vehicle drive is switched to the fifth gear position. If the synchronizer sleeve 56 is moved away from the engine 70, on the other hand, the output shaft 40 is disconnected from the input shaft 9, and the sleeve 56 abuts the end surface of the parking gear 61 on the engine 70 side and is stopped.

In a gear shift to the reverse gear position, moreover, both the clutches 12 and 13 are in a disengaged state first. Then, the synchronizer sleeve 56 of the synchromesh mechanism 50 slides to the reverse side so that the reverse driven gear 33 and the output shaft 40 engage with each other. Thus, the reverse gear position is selected. Thereafter, the clutch 12 is engaged. When this is done, the rotation output from the engine 70 is transmitted to the differential mechanism 44 via the input shaft 10, second drive gear 7, second driven gear 37, idler gear 60 on the driven gear 37, reverse driven gear 33, output shaft 40, and output gear 42. Thus, the rotation output from the input shaft 10 is a reverse rotation output that is reduced with the respective reduction ratios of the second and reverse gear positions and the final reduction ratio of the output shaft 40. Then, the output is transmitted from the output shaft 40 to the differential mechanism 44, whereupon the vehicle is reversed with a high reduction ratio.

Further, a parking lock is performed by activating an actuator (not shown) in association with a parking operation. When the transmission is set in the parking position, the pawl member 62 is rotated. Thereupon, a claw portion 62a (shown in FIG. 3) at the distal end of the pawl member 62 engages with a tooth portion 61a (shown in FIG. 3 only) on the outer periphery of the parking gear 61, as indicated by two-dot chain line in FIG. 3. Based on this engagement, the output shaft 40 is locked by the parking gear 61 and the synchronizer hub 55, whereupon the vehicle is fixed.

Furthermore, the number of gear positions for the output shaft 40 is smaller than that for the output shaft 41. The synchromesh mechanism 51 is disposed on the end portion of the output shaft 40. The parking gear 61 is disposed on the synchronizer hub 55 of the synchromesh mechanism 51 (for the fifth gear position). With this configuration, the parking gear 61 can be easily provided on the output shaft 40 without changing the layouts of the fifth, fourth, and reverse driven gears 31, 32 and 33 and the synchromesh mechanisms 51 and 52 (for the fifth and fourth/reverse gear positions) on the output shaft 40.

Since the parking gear 61 is not disposed directly on the output shaft 40, moreover, the number of component parts can be reduced. Further, an assembly process can be simplified, and the axial dimension of the transmission case 16 of the double-clutch transmission can be reduced. Since the parking gear 61 is butted against the stepped portion 66 when it is positioned, it can be highly accurately assembled on the output shaft 40 with a simple configuration.

The synchronizer sleeve 56 contacts an end surface of the parking gear 61. Therefore, the sleeve 56 can be securely stopped from returning without using any separate component part. An elastic member may be mounted between a stop surface of the parking gear 61 and the synchronizer sleeve 56. If the elastic member is mounted, the sleeve 56 and the gear 61 can be prevented from directly contacting each other, so that a soundproof effect can be obtained favorably.

The output shafts 40 and 41 are located at the upper and lower parts, respectively, of the body portion 1. In consequence, a concave portion 1a is formed beside the upper part of the body portion 1, as shown in FIG. 2. In mounting the engine in the vehicle, therefore, the side frame 63 (frame member extending in the widthways relative to the vehicle body) and the like in the engine compartment, which is situated in the concave portion 1a, never contact the transmission. Thus, there may be provided a double-clutch transmission with high vehicle mountability such that the engine can be mounted in many types of vehicles.

Further, the parking gear 61 is attached to the synchromesh mechanism 51, which shifts in one direction. Conventionally, therefore, one side of the synchromesh mechanism 51 has not been utilized. According to the present invention, both sides of the synchromesh mechanism 51 can be utilized, so that a dead space inside the transmission can be reduced. Furthermore, the cylindrical extending end portion 64 overlaps the outside of the bearing 39a. Therefore, the parking gear 61 can radially overlap the bearing 39a, so that the axial dimension of the vehicular transmission can be reduced.

The parking gear 61 is disposed on the synchronizer hub 55. Therefore, the parking gear 61 can be firmly fixed to the output shaft 40. Further, the synchronizer sleeve 56 and the parking gear 61 are independent parts. If a heavy load is applied to the gear 61, therefore, it can never influence the operation of the synchromesh mechanism 51 and the like. Since the synchronizer hub 55 is assembled on the output shaft 40, moreover, the parking gear 61 can be disposed on the output shaft 40, so that the assembly process can be made very simple.

The present invention is not limited to the one embodiment described above, and various changes or modifications may be effected therein without departing from the spirit of the invention. In the foregoing embodiment, the synchromesh mechanism 51 is disposed on the end side of the output shaft 40 opposite from the engine 70. Alternatively, however, the synchromesh mechanism 51 and the fifth driven gear 31 may be reversed in position so that the driven gear 31 is located on the side opposite from the engine 70.

In order to solve the problems, according to the present invention, a transmission is constructed in the following manner.

1. A transmission for vehicles is composed of an input shaft to which a driving force is input from an engine, a drive gear which is fixed to the input shaft and rotates together with the input shaft, an output shaft disposed parallel to the input shaft, a driven gear which meshes with the drive gear and is rotatably disposed on the output shaft, a hub which is fixed to the output shaft so as to adjoin the driven gear on an end side of the output shaft and rotates together with the output shaft, and a sleeve which is located around the hub so as to be continuously rotatable together with the hub and axially slidable and moves away from the end of the output shaft so that the driven gear is drivingly connected to the output shaft, an outer peripheral end of the hub extending toward the shaft end so that a parking gear is formed integrally on the extending end.

Thus, in the transmission for vehicles according to the invention, the parking gear is formed on the hub of the synchromesh mechanism. The parking gear may either be formed integrally with the hub or be formed independently of the hub and assembled on it. In the case where the parking gear is assembled on the hub, a stepped portion is previously provided on the hub. The parking gear is butted against the stepped portion and assembled on the hub. Thereupon, the parking gear can be fixed in a predetermined position on the hub.

2. The transmission for vehicles as stated in item 1, in which the input shaft is provided with an input mechanism which is composed of a first input shaft, provided with drive gears of one of two predetermined groups of gear positions, and a second input shaft, provided with drive gears of the other gear position group and disposed around the first input shaft for rotation around the axis of the first input shaft, and includes the first and second input shafts and a first clutch, which is disposed on one end portion of the first input shaft and transmits the driving force from the engine to the first input shaft, and a second clutch, which is disposed on one end portion of the second input shaft and transmits the driving force to the second input shaft, the output shaft is provided with an output mechanism which is composed of a first output shaft and a second output shaft, located parallel to the first and second input shafts and provided with rotatable driven gears that individually mesh with the drive gears on the first and second input shafts, and includes a synchromesh mechanism which causes the driven gears to engage with the first or second output shaft corresponding thereto, and the hub is attached to the synchromesh mechanism which is configured to engage with the first or second output shaft, whichever is shorter.

Thus, in the transmission of a so-called double-clutch system, the parking gear is disposed on the hub of the synchromesh mechanism.

3. The transmission for vehicles as stated in item 2, in which a bearing for the output shaft is composed of a first bearing located near the engine and a second bearing located more remotely from the engine than the first bearing is, the parking gear and the second bearing radially overlapping each other.

In order to radially overlap the parking gear and the second bearing, the parking gear is formed so that its inside diameter is larger than the outside diameter of the second bearing and overlaps the outer periphery of the second bearing.

4. The transmission for vehicles as stated in item 3, in which an end surface of the parking gear on the engine side forms a stop surface which stops a movement of the sleeve on the end side of the output shaft. For example, the parking gear is formed so that its diameter is larger than that of a sliding surface of the sleeve. The sleeve is configured to contact the end surface of the parking gear when it moves toward the shaft end.

The transmission for vehicles according to the present invention has the following effects.

Since the parking gear is disposed on the hub of the synchromesh mechanism, a space need not be provided for the parking gear to be mounted on the output shaft. Therefore, the output shaft can be shortened so that the axial dimension (transverse dimension) of the transmission can be reduced. Further, the parking gear can be firmly fixed to the output shaft. Since no component is required for use as the parking gear, the number of component parts can be reduced. The parking gear can be mounted on the output shaft without entailing any trouble of machining, so that the manufacturing costs can be reduced.

Since the parking gear can overlap the bearing, the axial dimension of the transmission can be reduced.

Since the sleeve is stopped by the end surface of the parking gear, no special member is needed to stop the sleeve. Thus, the number of component parts can be reduced, and an assembly process can be simplified. Further, the movement of the sleeve can be securely stopped by the shaft end.

Since the transmission can be reduced in axial dimension, its interference with side members, steering mechanism, etc., in the engine compartment can be reduced when the engine is assembled in a vehicle. Thus, the engine that is provided with this transmission can be mounted in many types of vehicles. Further, the system of the double-clutch transmission is so complicated that the reduction of the size and the number of component parts of the transmission by the parking gear can be regarded as a more advantageous effect.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A transmission for vehicles, comprising:
   an input shaft to which a driving force is input from an engine;
   a drive gear which is fixed to the input shaft and rotates together with the input shaft;
   an output shaft disposed parallel to the input shaft;
   a driven gear which meshes with the drive gear and is rotatably disposed on the output shaft;
   a hub which is fixed to the output shaft so as to adjoin the driven gear on an end side of the output shaft and rotates together with the output shaft; and
   a sleeve which is located around the hub so as to be continuously rotatable together with the hub and axially slidable and moves in an opposite direction to the end of the output shaft so that the driven gear is drivingly connected to the output shaft,
   a bearing of the output shaft being composed of a first bearing in vicinity of an arrangement side of the engine and a second bearing arrange at a position remote from the engine farther than the first bearing, an outer peripheral end of the hub extending toward the shaft end so that a parking gear is formed integrally on an extending end, and the parking gear and the second bearing being axially superposed on each other.

2. The transmission for vehicles, according to claim 1, wherein the sleeve located around the hub forms a synchronizing mechanism of a one-direction type which only selectively connect and disconnect the driven gear to the output shaft, such that the sleeve moves in a direction opposite to the end of the output shaft so that the driven gear is drivingly connected to the output shaft.

3. The transmission for vehicles, according to claim 1, wherein a diameter of the parking gear is greater than a diameter of a slide surface of the sleeve.

4. The transmission for vehicles according to claim 1, wherein the second bearing is incorporated into an end wall of a transmission casing which accommodates the output shaft.

5. The transmission for vehicles, according to claim 1, wherein the hub is formed in a cylindrical Shape.

6. The transmission for vehicles according to claim 1, wherein an end surface of the parking gear on the engine side serves as a stop surface which stops a movement of the sleeve on the end side of the output shaft.

7. The transmission for vehicles according to claim 6, wherein an elastic member is provided between the stop surface and the sleeve.

8. The transmission for vehicles, according to claim 1, wherein
   the input shaft is composed of a first input shaft which has drive gears in one transmission speed group, of transmission speeds classified in two predetermined groups, and a second input shaft which has drive gears in the other transmission speed group and which is disposed around the first input shaft so as to be rotatable around a center of the first input shaft;
   the transmission for vehicles comprises an input mechanism which comprises the first and second input shafts, and a clutch disposed at one-side end portions of the first and second input shafts to transmit the driving force input from the engine to the first or second input shaft;
   the output shaft is composed of a first output shaft and a second output shaft which are disposed parallel to the first and second input shafts and which have driven gears meshing with drive gears of the first input and second input shafts, respectively, so as to rotate the driven gears;
   the transmission for vehicles comprises an output mechanism which comprises the first output shaft, the second output shaft, and a synchronizing mechanism engaging the driven gears with the first and second output shafts, respectively; and
   the hub is disposed to the synchronizing mechanism provided at a shorter output shaft of the first and second output shafts.

9. The transmission for vehicles according to claim 8, wherein the sleeve is disposed to the synchronizing mechanism provided at one of the first and second output shafts that has less driven gears than the other output shaft.

10. A transmission for vehicles, comprising:
    an input shaft to which a driving force is input from an engine;
    a drive gear which is fixed to the input shaft and rotates together with the input shaft;
    an output shaft disposed parallel to the input shaft;
    driven gear which meshes with the drive gear and rotatably disposed on the output shaft;
    a hub which is fixed to the output shaft so as to adjoin the driven gear on an end side of the output shaft and rotates together with the output shaft; and a sleeve which is located around the hub so as to be continuously rotatable together with the hub and axially slidable and moves in an opposite direction to the end of the output shaft so that the driven gear is drivingly connected to the output shaft, an outer peripheral end of the hub extending toward an end side of the output shaft, such that a parking gear is formed integrally on an extending end and an end surface of the parking gear on the engine side serving as a stop surface which stops a movement of the sleeve toward the end side of the output shaft.

11. The transmission for vehicles, according to claim 10, wherein a diameter of the parking gear is greater than a diameter of a slide surface of the sleeve.

12. The transmission for vehicles, according to claim 10, wherein an elastic member is provided between the stop surface and the sleeve.

* * * * *